United States Patent
Liardet et al.

(10) Patent No.: US 7,403,620 B2
(45) Date of Patent: Jul. 22, 2008

(54) CYPHERING/DECYPHERING PERFORMED BY AN INTEGRATED CIRCUIT

(75) Inventors: Pierre-Yvan Liardet, Peynier (FR); Fabrice Romain, Aix en Provence (FR); Yannick Teglia, Marseilles (FR); Laurence Sirtori, Trets (FR)

(73) Assignee: STMicroelectronics S.A., Montrouge (FR)

( * ) Notice: Subject to any disclaimer, the term of this patent is extended or adjusted under 35 U.S.C. 154(b) by 629 days.

(21) Appl. No.: 10/611,254

(22) Filed: Jul. 1, 2003

(65) Prior Publication Data
US 2004/0028224 A1 Feb. 12, 2004

(30) Foreign Application Priority Data
Jul. 2, 2002 (FR) .................................. 02 08268

(51) Int. Cl.
*H04L 9/00* (2006.01)
(52) U.S. Cl. ........................................ 380/259; 380/37
(58) Field of Classification Search .................. 380/37, 380/259, 28
See application file for complete search history.

(56) References Cited

U.S. PATENT DOCUMENTS

2003/0223580 A1* 12/2003 Snell ............................ 380/28

FOREIGN PATENT DOCUMENTS

| EP | 0 981 223 A | 2/2000 |
| EP | 1 109 350 A | 6/2001 |
| WO | WO 00 41356 A | 7/2000 |

OTHER PUBLICATIONS

Joan Daemen and Vincent Rijmen, AES Proposal; Rihndael, Mar. 9, 1999, retrieved date Jun. 25, 2006.*
Thomas S. Meeserges, Securing the AES Finalists Against Power Analysis Attacks,B. Schneier (Ed) pp. 150-164, 2001☐☐Retrieved date Jun. 25, 2006.*
French Preliminary Search Report from French priority application No. 0208268, filed Jul. 2, 2002.
Akkar, M.L. et al., *An Implementation of DES and AES, Secure Against Some Attacks*, Cryptographic Hardware and Embedded Systems, 3rd International Workshop, Ches 2001, Paris, France, May 14-16, 2001 Proceedings, Lecture Notes in Computer Science, Berlin: Springer, DE, vol. 2162, 2001 pp. 309-318, XP008002641.
Kocher, P. et al., *Differential Power Analysis*, Conference Crypto, 1999, pp. 388-397 XP000279852.

* cited by examiner

*Primary Examiner*—Gilberto Barron, Jr.
*Assistant Examiner*—Samson B Lemma
(74) *Attorney, Agent, or Firm*—Lisa K. Jorgenson; James H. Morris; Wolf, Greenfield & Sacks, P.C.

(57) ABSTRACT

A method of cyphering and/or decyphering, by an integrated circuit, of a digital input code by means of several keys, comprising: dividing the code into several data blocks of same dimensions; and applying to said blocks several turns of a cyphering or decyphering comprising submitting each block to at least one same non-linear transformation and of subsequently combining each block with a different key at each turn, the operands being masked, upon execution of the method, by at least one first random number having the size of the code and all the blocks of which have the same value by combining, by an XOR-type function, the input and output blocks of the non-linear transformation with said random number.

7 Claims, 5 Drawing Sheets

CYPHERING/DECYPHERING PERFORMED BY AN INTEGRATED CIRCUIT

BACKGROUND OF THE INVENTION

1. Field of the Invention

The present invention relates to the cyphering of digital data by means of algorithms intended to mask original data to make them undetectable by a possible pirate. The present invention more specifically relates to algorithms implementing a same transformation on different parts of the data to be coded.

2. Discussion of the Related Art

The cyphering/decyphering algorithms to which the present invention applies are generally executed by integrated circuits, either by means of state machines in wired logic, or by means of microprocessors executing a program in memory (generally a ROM). Such algorithms use secret keys specific to integrated circuits or to the user, which are exploited by the algorithm to code the data.

An example of a cyphering/decyphering algorithm to which the present invention most particularly applies is an algorithm known as the AES (Advanced Encryption Standard, FIPS PUB 197). This algorithm applies to a word or data code divided into blocks a same transformation several consecutive times based on different cyphering keys or, more specifically, on portions of a binary word forming a key.

FIG. 1 illustrates in a simplified flowchart the main steps of a conventional AES-type algorithm. Only the cyphering will be described, the decyphering using the inverse transformations.

This algorithm cyphers a word or code $S_0$ of a predetermined number of bits (generally, 128 bits) into another word or code $S_n$ of same size. The data to be cyphered are in fact formed of several words or codes resulting from a previous division of the data into words all having the same size. The cyphering and the decyphering are based on a secret key, the length of which (generally from 128 to 256 bits) conditions the cyphering security.

In practice, each step of an AES-type algorithm processes a matrix of four lines and four columns representing a word and each element of which is a byte or block of the processed 128-bit code. To simplify the following description, reference will be made for each step to a state considered as being a matrix.

To implement the cyphering or decyphering algorithm, 11 sub-keys each also comprised of 128 bits are first generated based on the secret key over 128 bits. More generally, based on a secret key of a number m of bits, n+1 sub-keys K0, ... Ki, ... Kn of m bits each are derived. These sub-keys are intended to be used by the algorithm as will be described hereafter in relation with FIG. 1.

The algorithm starts from an initial state (block 1, STATE INIT) $S_0$ of the code or data word to be cyphered.

A first phase of the cyphering process is a so-called "bleaching" operation (block 2, ADDROUNDKEY) which consists of performing an XOR-type combination of initial state $S_0$ with first sub-key $K_0$. A first intermediary state $S_1$ is obtained.

A second phase of the cyphering process consists of performing several turns or cycles of a same transformation T involving, at each turn, the state $S_{i-1}$, obtained at the preceding turn and a current sub-key Ki. The number of turns of transformation T corresponds to n−1, that is, to the number of derived sub-keys, minus 2.

Each turn of transformation T is formed of four successively-applied operations. FIG. 2 illustrates in more detail these four operations on a matrix 20 of four lines and four columns of binary bytes to which an AES-type algorithm applies.

A first step (block 3, SHIFTROWS) consists of performing a rotation on the last three lines of matrix 20. First line 201 of matrix 20 is left unchanged. Second line 202 is rotated by one byte. Third line 203 is rotated by two bytes. Fourth line 204 is rotated by three bytes.

A second step (block 4, SUBBYTES) of a turn of transformation T is a non-linear transformation in which each byte of matrix 20' forming the current state is replaced with its image taken from a substitution box (SBOX). As illustrated in FIG. 2, substitution box SBOX is obtained by two successive transformations. A first transformation (block 41, INV) consists of inverting the considered byte (the element of matrix 20') in the finite body of order $2^8$ (to correspond to the byte), byte 00 forming its own image. This inversion is followed by an affine transformation (block 42, AFFINE).

Examples of non-linear substitution transformations such as that disclosed hereabove are described, for example, in work "The Design of Rijndael" by Joan Daemen and Vincent Rijmen, published by Springer-Verlag (ISBN 3-540-42580-2) and in the AES standard (FIPS PUB 197), which references are incorporated herein by reference.

The third step (block 5, MIXCOLUMNS) of the turn of transformation T consists of considering each column of matrix 20" resulting from the preceding step as a polynomial on the finite body of order $2^8$, and of multiplying each of these polynomials by a combination polynomial P[X] modulo a polynomial M[X].

The last and fourth step of the turn of transformation T of rank i consists of applying sub-key Ki to matrix 20" of the previous state to obtain a matrix 20''', in which each element of matrix 20" has been combined by XOR, bit to bit, with sub-key Ki (block 6, ADDROUNDKEY). Step 6 is the same as step 2 of the first cyphering phase, but performed with a different sub-key.

At the end of step 6, one obtains, for a turn of rank i, a state $S_i=T(Ki, S_{i-1})$. The four steps of the turn transformation are repeated n−1 times, that is, after step 6, it is returned to step 3 to perform a new turn with a next key.

The third phase of the cyphering algorithm (FIG. 1) consists, in a way, in a last turn, slightly modified as compared to that illustrated in FIG. 2. In fact, the steps of the turn transformation are reproduced except for the third one (MIXCOLUMNS). This amounts to successively performing steps 7, 8, and 9 corresponding to previously-described steps 3, 4, and 6 with, as the key for step 9, the last sub-key Kn.

State $S_n=T'(Kn, S_{n-1})$ is then obtained. This result is finally set up (block 10, RESULTFORM) for a subsequent use.

A known weakness of implementations on smart cards of AES-type algorithms or more generally of algorithms implementing several turns or cycles of a same transformation (T) on a code divided into blocks, is the sensitivity to attacks by analysis of the current consumption of the circuit executing the algorithm. Such an attack known as a DPA (Differential Power Analysis) consists of correlating the power consumption of the integrated circuit executing the algorithm with the secret keys used upon cyphering or decyphering. In practice, based on a message to be cyphered and on hypotheses about the secret key, a statistic correlation curve is established along time between the power consumption of the product for the message cyphering and an intermediary value calculated by the circuit. Such power consumption attacks are described in literature (see, for example, article "Differential Power Analysis" by Paul Kocher, Joshua Jaffe, and Benjamin Jun, published in 1999, CRYPTO Conference 99, pages 388-397, published by Springer-Verlag LNCS 1666), which is incorporated herein by reference.

A known solution to make the algorithms more resistant against differential power analysis attacks of the integrated circuit, consists of involving a random number in the execution of the algorithm. The use of a random value consists of masking the state at the beginning of the algorithm by this random value and of restoring the expected result at the end of the algorithm.

FIG. 3 partially and very schematically illustrates a first known technique of introduction of a random number Rd in the execution of an AES-type algorithm. Starting from an initial state of the matrix (block 11, STATEINIT), a bit-to-bit XOR type combination (block 12, +) with a random number Rd is performed. This number is thus introduced before step 2 of combination with first sub-key K0. This random number Rd must then be taken into account at some stages of the algorithm. First, in non-linear transformation steps 4 and 8 (SUBBYTES), a substitution box ($SBOX_{Rd}$) taking the random number into account must be used. Then, for each turn transformation, after the introduction of current key Ki (step 6), an XOR-type combination (block 13, +) with number Rd must be performed. Moreover, after step 13, the obtained result is combined (block 15, +) by XOR with an amount MC(SR(Rd)) corresponding to the application of the row shifting SR (SHIFTROWS) and column mixing MC (MIXCOLUMNS) functions to number Rd.

After the last transformation T', the combination (block 16, +) by XOR of the obtained result with value SR(Rd) corresponding to the application of the row shifting to value Rd enables recovering the expected result.

The necessary use of a substitution box which is a function of the random number compels to recalculate this box for each cyphering or decyphering. This recalculation of the substitution boxes, necessary to obtain a good resistance against DPA attacks, results in a strong need for memory in the integrated circuit and lengthens the algorithm execution time by the necessary calculation time. For example, for codes (matrixes) over 128 bits, the recalculation of a substitution box $SBOX_{Rd}$ for each byte of the state requires 16 boxes of 256 bytes, which amounts to 4 kilobytes of memory. Such a memory is far from being negligible when integrated, for example, in a smart card.

FIG. 4 illustrates a second conventional solution to involve a random value in a cyphering algorithm of AES type. This solution is described in article "An implementation of DES and AES, secure against some attacks" by M. L. Akkar and C. Giraud, published at the CHES conference 2001 (Springer-Verlag editors).

This solution consists of replacing the use of substitution boxes with transformations calculated at each turn of the algorithm. The result is the same, in that it leads to a substitution of the different matrix bytes. What changes is the way to obtain this substitution.

According to this solution, two random numbers Rd1 and Rd2 are used, and made to intervene at different steps of the algorithm. First random number Rd1 intervenes at the beginning (between blocks 1 and 2) and is added (XOR-type combination 22). Second random value Rd2 is introduced into the turns of the transformation, be it the n−1 identical transformations T or the last transformation T'.

The result of row shifting step 3 or 7 is combined by a polynomial multiplication 23 with coefficients on the finite body of order $2^8$ (modulo an irreducible polynomial) with random value Rd2. Then, the obtained resulting matrix is added (XOR-type combination) with a matrix representing the result of the previous operation ($S_i$*Rd2). This addition is symbolized by a block 25 in FIG. 4.

The two previous operations are performed before byte substitution step 24 which here is essentially comprised of two transformations. A first transformation (block 241, INV) consists of inverting each byte of the matrix resulting from step 25. Then, the product (byte by byte modulo an irreducible polynomial) of initial state $S_i$ by the inverse ($Rd2^{-1}$) of the random value is added (XOR) to this inverse matrix (block 242, +). The result is then multiplied (block 243, X) by random value Rd2. There again, this is a polynomial multiplication. Finally, the last byte substitution step 24 of the matrix consists in an affine transformation 244 (AFFINE). At the end of step 24, the resulting matrix is submitted to the step of addition of the corresponding sub-key (step 6 or 9).

In a turn of a transformation, the step following step 24 is step 5 (MIXCOLUMNS). Then, after step 6, the obtained result is combined (block 26, +) by XOR with value Rd1. The result of addition 26 is combined (block 27, still by XOR, with result (MC(AF(SR(Rd1)))) of the polynomial column mixing processing (MC) of affine transformation AF applied to the row shifting SR applied to value Rd1.

In last transformation T', the step following step 24 is step 9 with key Kn. Finally, the obtained result is combined (block 29, +) by XOR with the result (AF(SR(Rd1))) of affine transformation AF applied to row shifting SR applied to value Rd1. The output of block 29 provides the state to be set up by step 10.

Such a solution requires less memory than the first conventional solution illustrated in relation with FIG. 3. However, it considerably increases the algorithm execution time. Indeed, at each turn of the algorithm, the operation corresponding to the substitution becomes complex and requires many operations modulo a polynomial.

The problem of the processing by a random number is essentially due to the fact that, in an algorithm of the type to which the present invention applies, the substitution operation is a non-linear operation.

SUMMARY OF THE INVENTION

The present invention aims at providing a novel solution to the introduction of at least one random value in an AES-type cyphering algorithm which overcomes the disadvantages of known solutions. More generally, the present invention aims at providing the introduction of at least one random value in an algorithm submitting a code or input word, divided into blocks, several times to the same transformation (by a substitution matrix) with different keys.

The present invention also aims at providing a solution which reduces the number of times that a substitution box must be calculated and/or stored.

The present invention also aims at reducing the calculation time necessary to the execution of the algorithm after introduction of the random number.

To achieve these and other objects, the present invention provides a cyphering/decyphering method, by an integrated circuit, of a digital input code by means of several keys, comprising:

dividing said code into several data blocks of same dimensions; and applying to said blocks several turns of a cyphering or decyphering comprising submitting each block to at least one same non-linear transformation and of subsequently combining each block with a different key at each turn, the operands being masked, upon execution of the method, by means of at least one first random number having the value of said code and all the blocks of which have the same size by combining, by an XOR-type function, the input and output blocks of the non-linear transformation with said random number.

According to an embodiment of the present invention, the input code is combined with a second random number of same dimension as the code.

According to an embodiment of the present invention, said non-linear transformation comprises using a box of substitution of the input code blocks, calculated with a third random number of same length as said code and all the blocks of which have the same value. According to the present invention, said box respects the fact that the transformation of an input code, previously combined by XOR with the first random number, corresponds to the result of the combination by XOR of this input code with said third random number.

According to an embodiment of the present invention, the method is applied to an AES-type cyphering algorithm.

According to an embodiment of the present invention, said first random number is changed at each cyphering turn.

According to an embodiment of the present invention, said second random number is changed at each cyphering of new data.

According to an embodiment of the present invention, said third random number is changed at each cyphering turn.

The present invention also provides an integrated circuit comprising a block for cyphering/deciphering by turn input data divided into blocks of same dimensions, comprising:

means for generating at least one first random number of same size as the size of the blocks of the input data; and means for combining said random number with each block, at the input and at the output of a non-linear transformation implemented by the cyphering/decyphering.

The foregoing objects, features and advantages of the present invention, will be discussed in detail in the following non-limiting description of specific embodiments in connection with the accompanying drawings.

DETAILED DESCRIPTION

Figure 1:
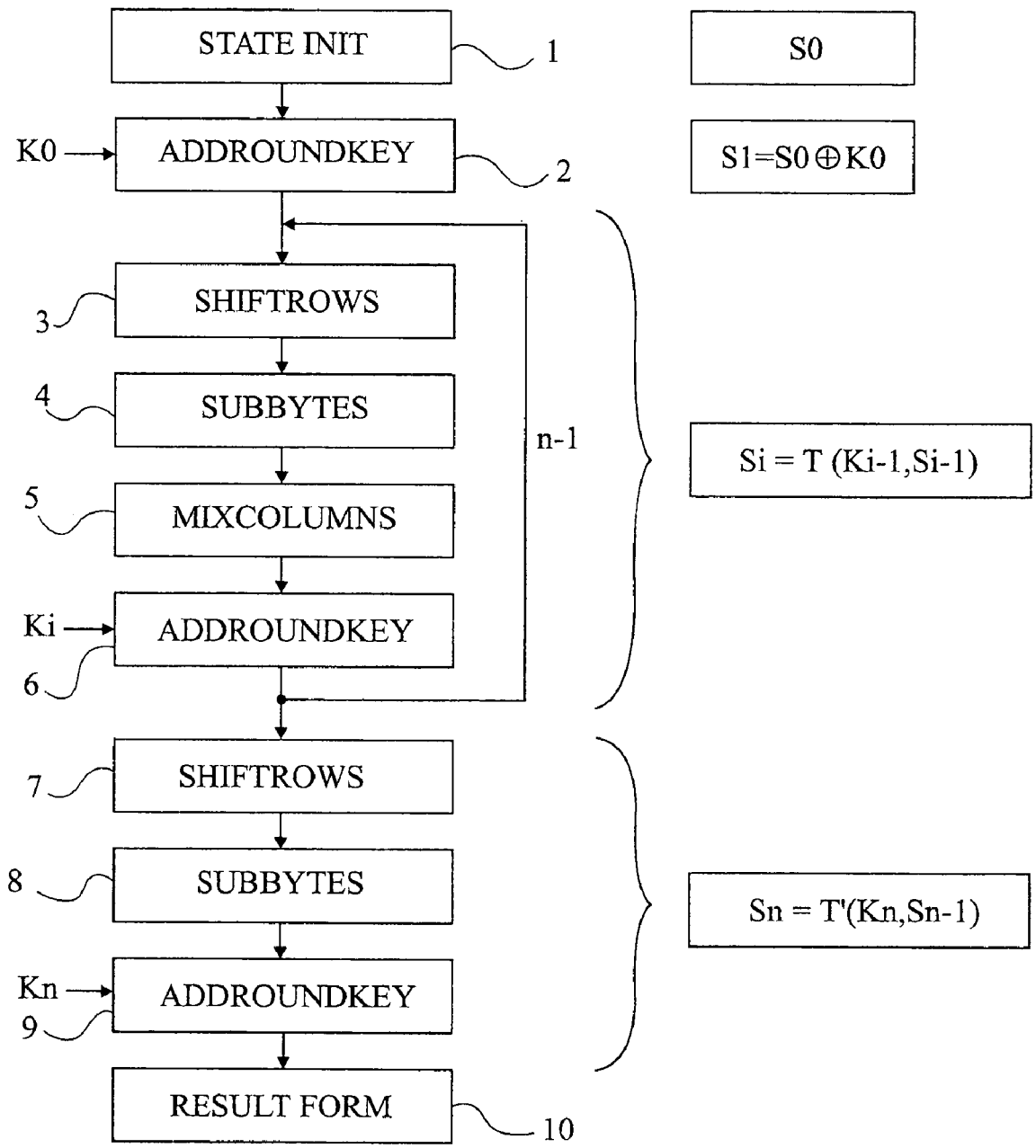
FIG. 1, previously described, illustrates in a simplified flowchart a conventional cyphering method of the type to which the present invention applies.
Figure 2:
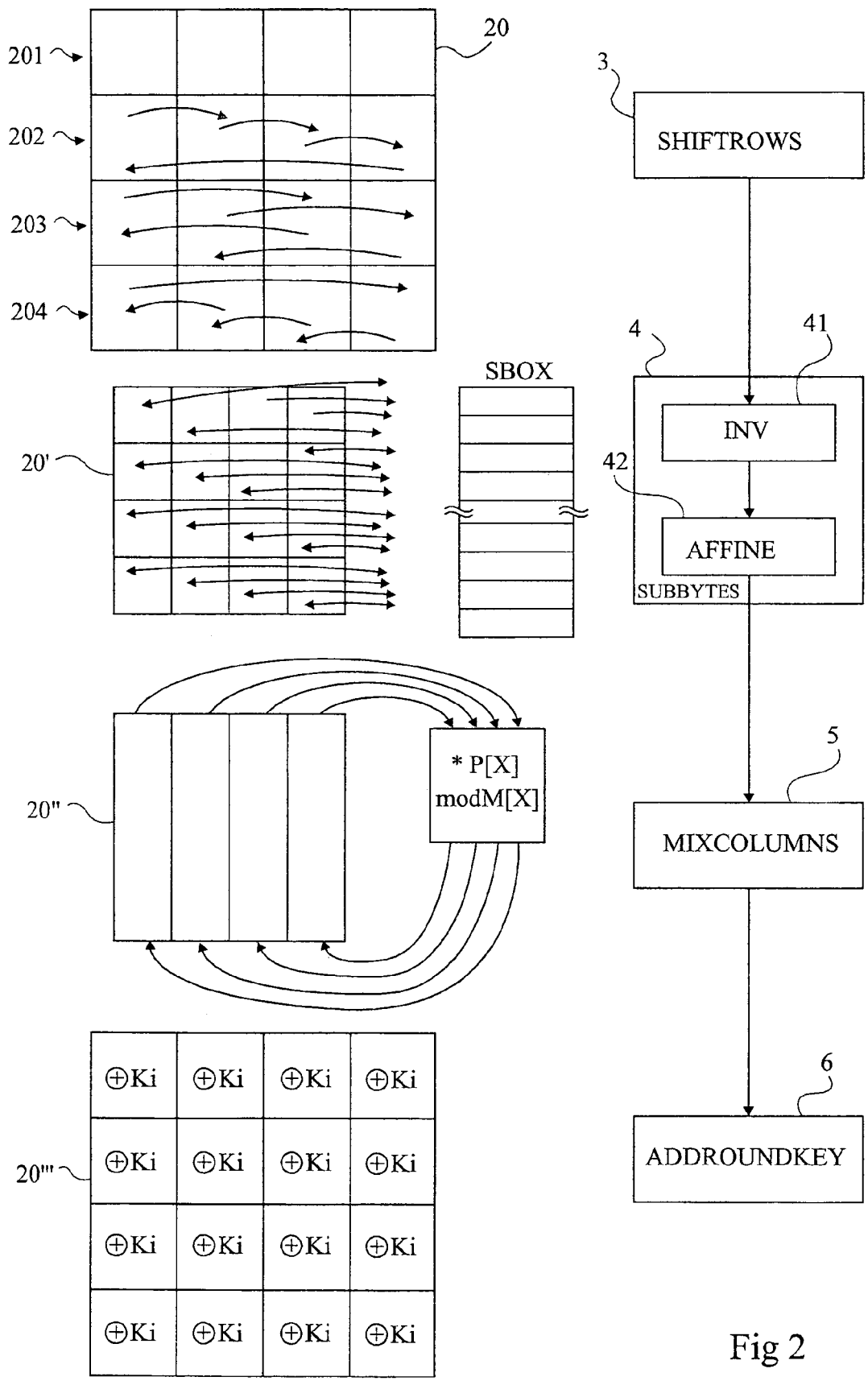
FIG. 2, previously described, illustrates the processings performed on a matrix state in a turn of a transformation of the method of FIG. 1.
Figure 3:
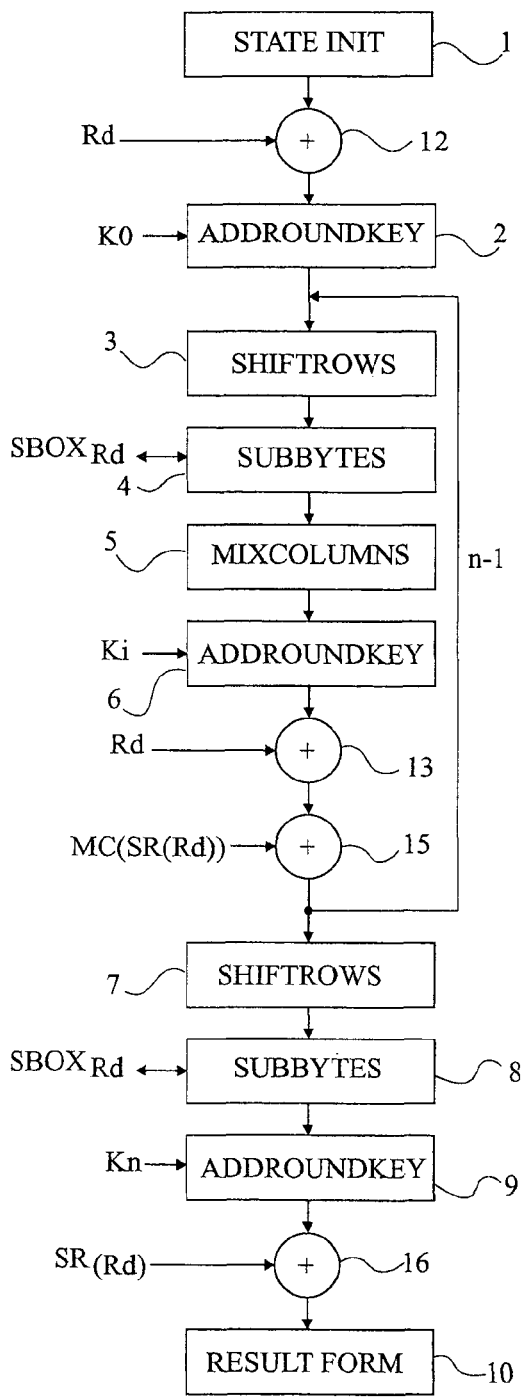
FIG. 3, previously described, shows the steps of a first conventional method of taking into account of a random number in a cyphering algorithm of the type illustrated in FIG. 1.
Figure 4:
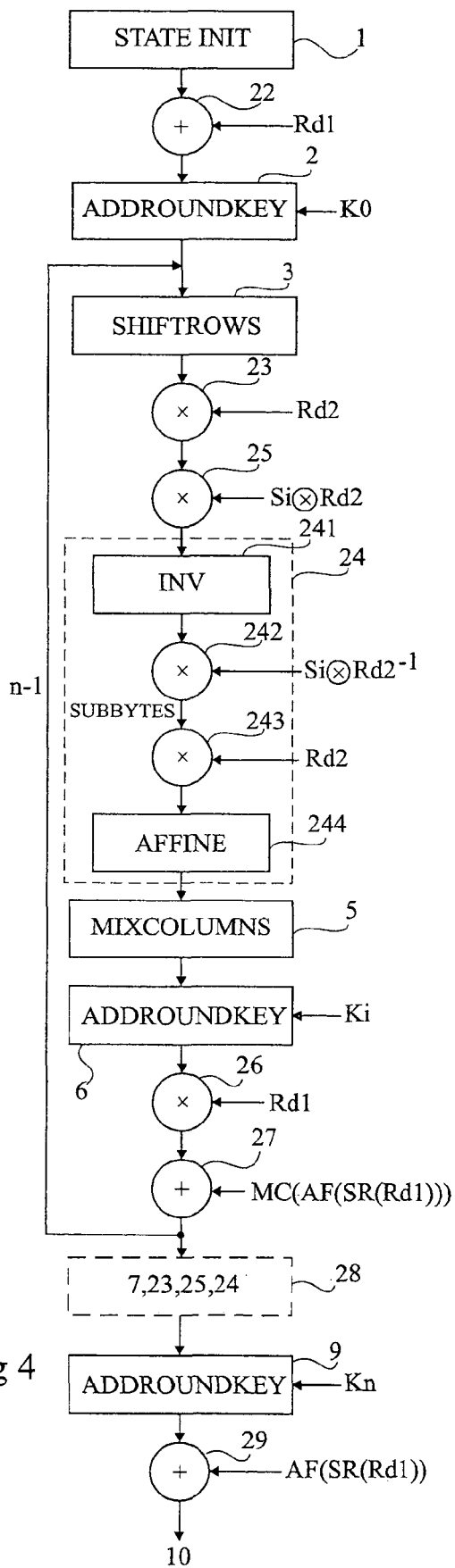
FIG. 4, previously described, shows a second conventional solution of introduction of random numbers in a cyphering algorithm of the type shown in FIG. 1.

For clarity, only those steps that are necessary to the understanding of the present invention have been shown in the drawings and will be described hereafter. In particular, the processings upstream and downstream of the cyphering algorithm have not been detailed and are no object of the present invention. Further, the operations of division of the secret quantity into several sub-keys to be taken into account by the algorithm, as well as the generation of the adapted random numbers have not been described in detail and are within the abilities of those skilled in the art based on the indications which will be given hereafter.

According to the present invention, a random value having the same size as the state to be cyphered (the matrix) is used for the transformations processing several bytes at the same time or which mix them together, as is the case for transformations of column mixing, sub-key introduction, and row shifting type.

However, this random value is not used for non-linear functions, such as those implemented for the byte substitution by a substitution box in the considered case. According to the present invention, a substitution box is masked by another random value, the bytes of which (or more generally, the blocks of a size corresponding to the size of the blocks of the code taken into account in the substitution box) are all identical. Although it is thus performed by means of a random value of one byte, such a masking operation is efficient since, due to the complete masking of the functions operating over the entire block, it is not possible for a pirate to exploit this specificity through a correlation function. According to an alternative embodiment, a pseudo-random value, linked to this random value, is also used to mask the substitution box.

Figure 5:
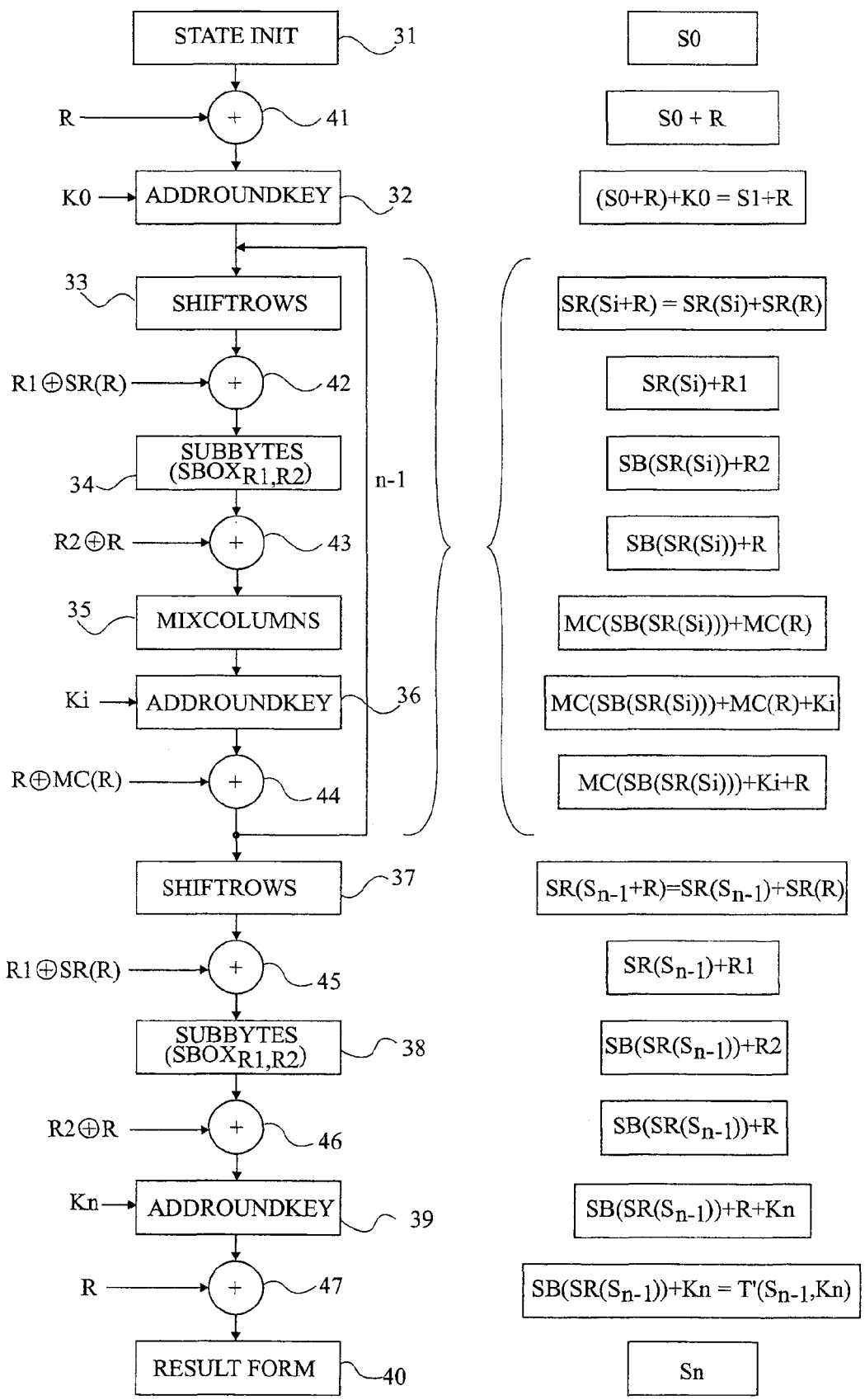
FIG. 5 illustrates in a simplified flowchart an embodiment of a cyphering algorithm according to the present invention.

FIG. 5 shows a flowchart of an implementation mode of an AES-type algorithm, masked by means of random and/or pseudo-random values according to the present invention.

In the following description, reference will be made to the sizes of binary words, taking the example of an AES algorithm using a 128-bit key and a division of a 128-bit input code in the form of an array of four rows and four columns of bytes. It should however be noted that all that will be described hereafter applies whatever the size of the keys and of the input and output codes, provided that the possible relations therebetween be respected. In particular, it should be noted that the size of the random values (possibly the pseudo-random values) used for the substitution box must correspond to the size of a matrix element, while the size of the random value (possibly, the pseudo-random value) used for the linear transformations must correspond to the size of a complete input state. By definition, an XOR-type combination is designated as the addition, a polynomial multiplication modulo an irreducible polynomial is designated as the multiplication.

In the left-hand portion of FIG. 5, the successive steps of the cyphering algorithm have been shown, while in the right-hand portion of this drawing the states obtained at the end of each step have been indicated.

The process starts from an initial state (block 31, STATE INIT). State $S_0$ corresponds to the code (data) to be cyphered by the algorithm.

First step 41 comprises performing an XOR-type combination of state $S_0$ with a random value R having the same size as state $S_0$ (for example, 128 bits).

Then, a conventional step 32 of sub-key addition (block 32, ADDROUNDKEY) by an XOR-type combination of first sub-key K0 with the result of the preceding step is executed. The obtained state corresponds to state $S_i$+R.

The second phase of the cyphering method comprising executing n−1 turns of a same transformation T is then entered. This transformation involves the steps of the conventional process (for example, AES) which are desired to be masked by at least one random value. In the example shown, these are row shifting step 33 (SHIFTROWS), step 34 (SUB-BYTES) of byte substitution by means of a substitution box SBOX, column mixing step 35 (MIXCOLUMNS), and step 36 of XOR combination (ADDROUNDKEY) with sub-key Ki of rank i.

According to the present invention, between these steps, two random values R1 and R2 (possibly, Rb1=R2) each formed of sequences of bytes of same value are introduced. The number (for example, 16) of bytes of each value corresponds to the number of bytes of a processed state (fore example, 128 bits).

At the output of step 33, a matrix having shifted rows from state matrix $S_i$ combined with random value R is obtained. Designating the row shifting function as SR, the following can be written at the end of step 33: $SR(S_i+R)=SR(S_i)+SR(R)$.

According to the present invention, before performing the substitution of step 34, state $SR(S_i)+SR(R)$ is combined (block 42) with a value of same size $(R1+SR(R))$ corresponding to the application of the row shifting to random value R $(SR(R))$ combined, byte by byte, by XOR with random value R1. In other words, the state is masked by a value of same size, each byte of which has the same random value.

Step 34 of byte-by-byte substitution by means of substitution box $SBOX_{R1,R2}$ is then performed. This box is, according to the present invention, a function of value R2 and is linked to value R1, respecting the following relation:

$SB(S_i+R1)=SBOX(S_i)+R2$, where SBOX represents the substitution box of the algorithm that is desired to be masked and SB designates the byte substitution function (SUBBYTES). In other words, a new substitution box SB is calculated based on table SBOX of the algorithm which is desired to be masked by values R1 and R2.

To the result $(SB(SR(S_i))+R2)$ of step 34 which corresponds to a state masked by value R2 (each byte of the matrix is masked by a byte of same value), an XOR-type combination is applied (block 43) with XOR combination R2+R (byte by byte) of the value R over 128 bits and of byte R2.

The result $(SB(SR(S_i))+R)$ undergoes column mixing transformation 35 of the conventional algorithm. Still respecting the conventional algorithm, sub-key Ki is introduced by step 36 of XOR combination with the preceding matrix. Result $MC(SB(SR(S_i)))+MC(R)+Ki$, where MC designates column mixing function MIXCOLUMNS, is combined (block 44) with a matrix corresponding to the sum (XOR-type combination) of random value R and of this same value MC(R) having undergone a column mixing transformation identical to transformation 35.

The cyclic transformation ends with step 44 at the end of which, according to rank i, it is returned to step 33 for a new iteration, or it is proceeded to step row shifting 37 (SHIFTROWS) of the last transformation T'.

There again, the present invention comprises interposing, between some steps of the algorithm, the execution of which is desired to be masked by random values, logic combinations of the matrixes processed by values R1 and R2.

The transformation by substitution matrix 38 is identical to that described in relation with step 34, but framed by combinations 45 and 46. These combinations are identical to previously-described combinations 42 and 43, upstream and downstream of transformation 34.

At the end of step 46, the obtained matrix $SB(SR(S_{i-1}))+R$ is combined with the last sub-key Kn (block 39). Then, the expected result is restored $(SB(SR(S_{n-1}))+Kn=T'(S_{n-1},Kn)$ by recombining (block 47, +) by XOR the matrix obtained with first random value R of same size as this matrix. Result Sn is then conventionally set up (block 40, RESULTFORM).

An advantage of the present invention is that quantities R1 and R2 as well as substitution box SBOX can be recalculated at each turn T of the cyclic transformation or at each cyphering or decyphering of the input data by the complete algorithm.

Another advantage of the present invention is that a memory corresponding to twice the matrix to be processed is sufficient to store the new substitution boxes (the old one and the new one) since said matrixes are combined with a random value, the size of which corresponds to that of an element of the matrix.

Figure 6:
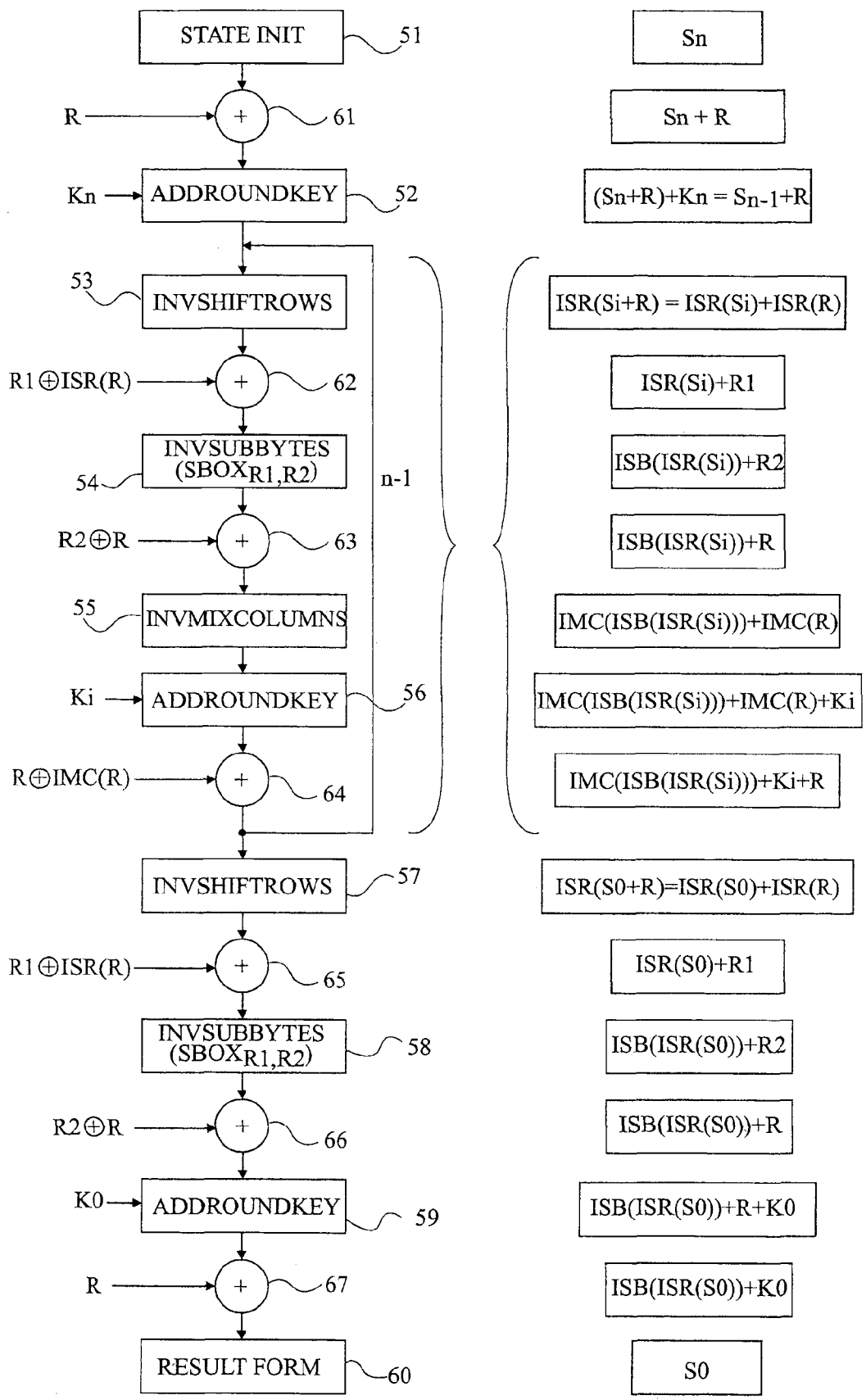
FIG. 6 shows, in a simplified flowchart, an embodiment of a decyphering method according to the present invention.

FIG. 6 shows, in the form of a simplified flowchart, an embodiment of an algorithm for decyphering data Sn according to the present invention.

As in the algorithm, the execution of which is desired to be masked by random values, the decyphering resumes the steps inverse of those of the cyphering except for the step of introduction of the keys or sub-keys Ki, which are performed in the reverse order.

The initial state (block 51, STATE INIT) here corresponds to a cyphered or encrypted state $(S_n)$ of the data.

As for the cyphering algorithm, the initial state is first combined (block 61) with a random quantity R having the same size as the initial data. Then, the obtained state $S_n+R$ is combined (block 52, ADDROUNDKEY) with the sub-key Kn which corresponds to the last portion of the cyphering key (in this example, the last byte). The obtained state $S_{n-1}+R$ is then submitted to n−1 cycles of a same decyphering transformation taking into account at each turn a sub-key Ki of lower rank.

The successive steps can be deduced from the previously-described cyphering steps:

shifting of inverse rows (block 53, INVSHIFTROWS, function ISR) corresponding to the inverse transformation of that of block 33;

XOR-type combination 62 with random quantity R1 and function 53 applied to random quantity R (ISR(R));

application (block 54, INVSUBBYTES, function ISB) of the inverse substitution box $INVSBOX_{R1,R2}$ of that used at step 34;

XOR-type combination 63 with quantities R2 and R;

inverse transformation (block 55, INVMIXCOLUMNS, function IMC) of the so-called column mixing transformation 35;

XOR-type combination (block 56, ADDROUNDKEY) with the sub-key Ki of rank i; and

XOR-type combination 64 with random quantity R and with the result of a transformation 55 (IMC) applied to this random quantity.

steps 62, 63, and 64 are identical to steps 42, 43, and 44 executed on cyphering. Steps 52, 53, 54, 55, and 56 correspond to the functions conventionally implemented for the decyphering of the algorithm, the execution of which is desired to be masked.

At the end of the last turn of this cyclic transformation, steps 57, 58, and 59 inverse of cyphering steps 37, 38, and 39 and corresponding to the conventional steps of the decyphering method, are successively applied, interposing the same combination steps 65, 66, and 67 as upon cyphering.

The result matrix $S_0$ corresponding to the decyphered data is thus obtained.

Of course, the present invention is likely to have various alterations, modifications, and improvements which will readily occur to those skilled in the art. In particular, the present invention which has been described hereabove in relation with the AES-type cyphering algorithm may be transposed to any cyphering algorithm, the input code of which is divided into blocks of identical sizes to be ciphered, each block being submitted to a same non-linear transformation.

Further, the adaptation of the present invention and of the sizes of the random quantities and of the used keys is within the abilities of those skilled in the art. It will be ascertained to respect a number of sub-keys corresponding to the numbers of turns and a size of random quantity R corresponding to the size of the sub-keys, and thus of the blocks. Moreover, the numbers indicated as being random numbers may originate from a pseudo-random generator.

Finally, the present invention applies whatever the use made of the cyphered data.

A specific example of application of the present invention relates to the implementation of an AES-type cyphering/decyphering algorithm in a smart card.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A cyphering/decyphering method, by an integrated circuit, of a digital input code by means of several keys, comprising:
    dividing said code into several data blocks of same dimensions;
    applying to said blocks multiple turns of a cyphering or decyphering comprising submitting each block to at least one same non-linear transformation and of subsequently combining each block with a different key at each turn, and
    masking inputs and outputs of the non-linear transformation, upon execution of the method, by means of at least one first random number having the size of said code by combining, by an XOR-type function, the input and output blocks of the non-linear transformation with said at least one first random number,
    wherein the at least one first random number comprises a plurality of blocks of bits and wherein each block of bits is identical,
    wherein said non-linear transformation comprises using a box of substitution of the input code blocks, calculated with a second random number of same length as said code and all the blocks of which have the same value, said box respecting the fact that the transformation of an input code, previously combined by XOR with the first random number, corresponds to the result of the combination by XOR of this input code with said second random number.

2. The method of claim 1, comprising combining the input code with a third random number of same dimension as the code.

3. The method of claim 1, applied to an AES-type cyphering algorithm.

4. The method of claim 1, wherein said first random number is changed at each cyphering turn.

5. The method of claim 2, wherein said third random number is changed at each cyphering of a new datum.

6. The method of claim 1, wherein said second random number is changed at each cyphering turn.

7. The method of claim 1, wherein a block of bits is a byte.

* * * * *

UNITED STATES PATENT AND TRADEMARK OFFICE
CERTIFICATE OF CORRECTION

PATENT NO. : 7,403,620 B2
APPLICATION NO. : 10/611254
DATED : July 22, 2008
INVENTOR(S) : Pierre-Yvan Liardet et al.

It is certified that error appears in the above-identified patent and that said Letters Patent is hereby corrected as shown below:

On the title page, Item (75) should read:
Inventors: Pierre-Yvan Liardet, Peynier (FR)
Fabrice Romain, Aix en Provence (FR),
Yannick Teglia, Marseille (FR),
Laurence Sirtori, Trets (FR)

Signed and Sealed this

Sixteenth Day of September, 2008

JON W. DUDAS
*Director of the United States Patent and Trademark Office*